United States Patent
Velozo et al.

(10) Patent No.: US 9,269,159 B2
(45) Date of Patent: Feb. 23, 2016

(54) SYSTEMS AND METHODS FOR TRACKING OBJECT ASSOCIATION OVER TIME

(71) Applicant: Promethean Limited, Blackburn, Lancashire (GB)

(72) Inventors: Steven C. Velozo, Seattle, WA (US); Alex H. Decker, Seattle, WA (US); Jason C. Hillier, Seattle, WA (US)

(73) Assignee: Promethean Limited (GB)

( * ) Notice: Subject to any disclaimer, the term of this patent is extended or adjusted under 35 U.S.C. 154(b) by 0 days.

(21) Appl. No.: 14/297,513

(22) Filed: Jun. 5, 2014

(65) Prior Publication Data

US 2015/0356746 A1    Dec. 10, 2015

(51) Int. Cl.
*G06K 9/00* (2006.01)
*G06T 7/20* (2006.01)
*G06T 7/60* (2006.01)
*H04N 7/18* (2006.01)

(52) U.S. Cl.
CPC .......... *G06T 7/2086* (2013.01); *G06K 9/00771* (2013.01); *G06T 7/2093* (2013.01); *G06T 7/606* (2013.01); *H04N 7/181* (2013.01); *G06T 2207/10016* (2013.01); *G06T 2207/30232* (2013.01)

(58) Field of Classification Search
USPC ....................................................... 382/103
See application file for complete search history.

(56) References Cited

U.S. PATENT DOCUMENTS

| 7,035,430 | B2 * | 4/2006 | Ito et al. ......................... 382/103 |
| 8,611,655 | B2 * | 12/2013 | Bryant ..................... H04N 1/60 382/162 |
| 2004/0117638 | A1 | 6/2004 | Monroe |
| 2004/0201586 | A1 * | 10/2004 | Marschner et al. ........... 345/426 |
| 2005/0031195 | A1 * | 2/2005 | Liu .............................. 382/154 |
| 2005/0226464 | A1 * | 10/2005 | Sun et al. ...................... 382/103 |
| 2008/0247601 | A1 | 10/2008 | Ito et al. |
| 2010/0197390 | A1 * | 8/2010 | Craig et al. .................... 463/30 |
| 2012/0194697 | A1 * | 8/2012 | Hasegawa et al. ......... 348/223.1 |
| 2013/0266181 | A1 | 10/2013 | Brewer et al. |
| 2014/0064558 | A1 * | 3/2014 | Huang et al. .................. 382/103 |

FOREIGN PATENT DOCUMENTS

EP        2720459        4/2014

OTHER PUBLICATIONS

Invitation to Pay Additional Search Fees and Partial International Search Report, dated Sep. 2, 2015, from corresponding International Application Serial No. PCT/US2015/034347.

PCT International Search Report, dated Nov. 10, 2015, from corresponding International Application Serial No. PCT/US2015/034347.

(Continued)

*Primary Examiner* — Alex Liew
(74) *Attorney, Agent, or Firm* — Brient Globerman, LLC

(57) ABSTRACT

A system and method for tracking association of two or more objects over time, according to various embodiments, is configured to determine the association based at least in part on an image. The system may be configured to capture the image, identify two or more objects of interest within the image, determine whether the two or more objects are associated in the image, and store image association data for the two or more objects. In various embodiments the system is configured to create a timeline of object association over time for display to a user.

17 Claims, 8 Drawing Sheets

(56) References Cited

OTHER PUBLICATIONS

Written Opinion of the International Searching Authority, dated Nov. 10, 2015, from corresponding International Application Serial No. PCT/US2015/034347.

PCT International Search Report, dated Oct. 12, 2015, from corresponding International Application Serial No. PCT/US2015/034354.
Written Opinion of the International Searching Authority, dated Oct. 12, 2015, from corresponding International Application Serial No. PCT/US2015/034354.

* cited by examiner

SYSTEMS AND METHODS FOR TRACKING OBJECT ASSOCIATION OVER TIME

CROSS-REFERENCE TO RELATED APPLICATIONS

This application is related to, but does not claim priority from, U.S. patent application Ser. No. 14/297,494, filed on Jun. 5, 2014, by inventor Steven C. Velozo, et al., and entitled "SYSTEMS AND METHODS FOR DETECTING, IDENTIFYING AND TRACKING OBJECTS AND EVENTS OVER TIME," which is hereby incorporated herein by reference in its entirety.

BACKGROUND

Teachers and other education professionals desire improved ways to engage with and track students and their progress. Similarly, national security concerns have led to a need for improved tracking techniques for security purposes. Accordingly, there is a need for improved systems and methods that address these needs.

SUMMARY

A computer-implemented method of tracking object associations over time, in various embodiments, comprises: (A) taking, by a first imaging device, a first image at a first time; (B) detecting, by the first imaging device, based at least in part on one or more change criteria, one or more changes between the first image and a second image taken by the first imaging device at a time prior to the first time; (C) identifying, by the first imaging device, a first object within the first image; (D) identifying, by the first imaging device, a second object within the first image; (E) determining, by the first imaging device, based at least in part on one or more object association criteria, whether the first object is associated with the second object in the first image; and (F) at least partially in response to determining that the first object is associated with the second object in the first image, storing, by the first imaging device, information associated with the association for the first time.

A computer system for tracking an association between two or more objects over time, in various embodiments, comprises an imaging device comprising one or more cameras and one or more processors. In particular embodiments, the imaging device is configured to: (A) capture a first image at a first time; (B) at least partially in response to capturing the first image, perform an object detection and identification analysis to detect and identify two or more objects of interest in the first image; (C) at least partially in response to identifying the two or more objects of interest in the first image, determine, based at least in part on one or more object association criteria, whether the two or more objects are associated in the first image; (D) at least partially in response to determining that the two or more objects are associated in the first image, store object association data for the two or more objects at the first time; (E) capture a second image at a second time; (F) at least partially in response to capturing the second image, detect, based at least in part on one or more change criteria, one or more changes between the first image and the second image; (G) at least partially in response to detecting the one or more changes between the first image and the second image, perform the object detection and identification analysis to detect and identify the two or more objects of interest in the second image; (H) at least partially in response to identifying the two or more objects of interest in the second image, determine, based at least in part on the one or more object association criteria, whether the two or more objects are associated in the second image; and (I) at least partially in response to determining that the two or more objects are associated in the second image, store object association data for the two or more objects at the second time.

A computer-implemented method of tracking object association over a period of time, according to various embodiments, comprises: (A) capturing, by a first imaging device, a plurality of images each taken at a particular time of the period of time; (B) performing, by the first imaging device, object detection and identification analysis to identify two or more objects of interest in a first particular one of the plurality of images; (C) detecting, by the first imaging device, based at least in part on one or more change criteria, one or more changes between the first particular one of the plurality of images and a second particular one of the plurality of images; (D) at least partially in response to detecting the one or more changes between the first particular one of the plurality of images and the second particular one of the plurality of images, performing, by the first imaging device, object detection and identification analysis to identify the two or more objects of interest in the second particular one of the plurality of images; (E) at least partially in response to identifying the two or more objects of interest in the second particular one of the plurality of images, determining, by the first imaging device, based at least in part on one or more object association criteria, whether the two or more objects are associated in the second particular one of the plurality of images; and (F) at least partially in response to determining that the two or more objects are associated in the second particular one of the plurality of images, storing, by the first imaging device, object association data for the two or more objects for the particular time at which the first imagining device captured the second particular one of the plurality of images.

BRIEF DESCRIPTION OF THE DRAWINGS

Various embodiments of a system and method for tracking object associations over time are described below. In the course of this description, reference will be made to the accompanying drawings, which are not necessarily drawn to scale, and wherein.

DETAILED DESCRIPTION

Figure 1A:
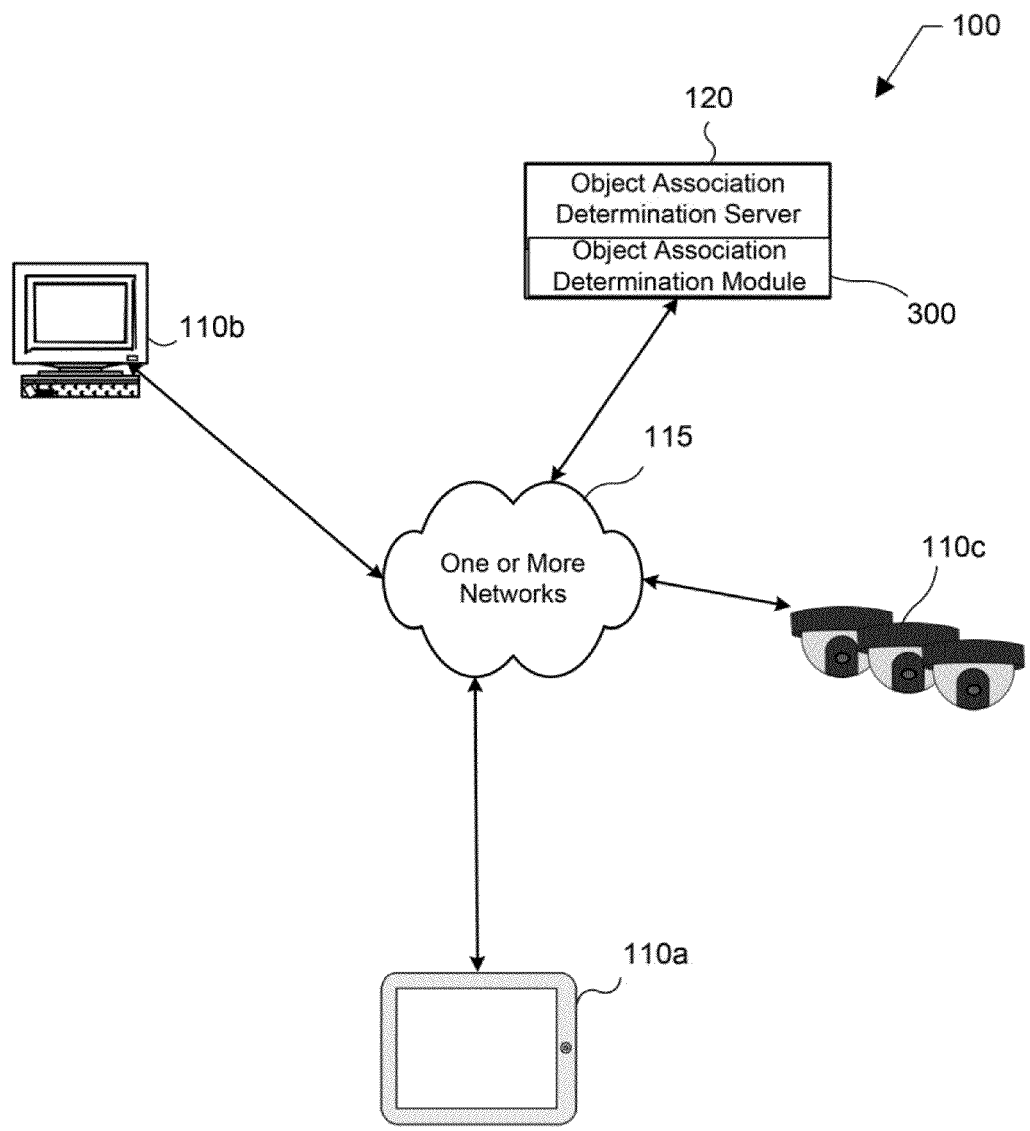
FIG. 1A is a block diagram of an object association tracking system in accordance with an embodiment of the present system.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

In particular embodiments, an object association determination and tracking system is configured to: (1) identify one or more objects of interest in an image; (2) determine whether the one or more objects are associated in the image; (3) store information about the association; and (4) create a timeline of the information about the association of the one or more objects over time. In various embodiments, the system is configured to capture a first image at a first time. The system may capture the first image using any suitable image capturing device (e.g., a smartphone, tablet computer, standalone camera or other suitable imaging device). The system, in particular embodiments, is further configured to identify at least a first object of interest and a second object of interest in the first image. The first and second objects of interest may include any suitable object such as, for example, a person, a piece of paper, an item, etc. The system may then be configured to determine, based on one or more object association criteria, whether the first and second object are associated with one another. In various embodiments, the one or more object association criteria include, for example, the proximity between the first and second objects, a frequency of the proximity of the first and second object (e.g., in other images captured by the system), etc. In response to determining that the first and second objects are associated in the first image, the system may then be configured to store object association information for the first and second objects at the first time and create a timeline of object association information from the object association information derived from the first image as well as from other images captured by the system at different times.

Exemplary Technical Platforms

As will be appreciated by one skilled in the relevant field, the present systems and methods may be, for example, embodied as a computer system, a method, or a computer program product. Accordingly, various embodiments may be entirely hardware or a combination of hardware and software. Furthermore, particular embodiments may take the form of a computer program product stored on a computer-readable storage medium having computer-readable instructions (e.g., software) embodied in the storage medium. Various embodiments may also take the form of web-implemented computer software. Any suitable computer-readable storage medium may be utilized including, for example, hard disks, compact disks, DVDs, optical storage devices, and/or magnetic storage devices.

Various embodiments are described below with reference to block diagram and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, a special purpose computer, or other programmable data processing apparatus to produce a machine. As such, the instructions which execute on the general purpose computer, special purpose computer, or other programmable data processing apparatus can direct a computer or other programmable data processing apparatus to function in a particular manner such that the instructions stored in the computer-readable memory produce an article of manufacture that is configured for implementing the functions specified in the flowchart block or blocks.

The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including but not limited to: a local area network (LAN); a wide area network (WAN); a cellular network; or the connection may be made to an external computer (for example, through the Internet using an Internet Service Provider).

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Example System Architecture

FIG. 1A is a block diagram of an Object Association and Tracking System 100 according to a particular embodiment. As may be understood from this figure, the Object Association and Tracking System 100 includes One or More Networks 115, One or More Remote Computing Devices 110a, 110b, 110c (e.g., such as a smart phone, a tablet computer, a wearable computing device, a laptop computer, a desktop computer, a smart camera, etc.), and an Object Association Determination Server 120. In particular embodiments, the One or More Networks 115 facilitate communication between the One or More Remote Computing Devices 110a, 110b, 110c and the Object Association Determination Server 120.

The One or More Networks 115 may include any of a variety of types of wired or wireless computer networks such as the Internet, a private intranet, a mesh network, a public switch telephone network (PSTN), or any other type of network (e.g., a network that uses Bluetooth or near field communications to facilitate communication between computing devices). The communication link between the One or More Remote Computing Devices 110a, 110b, 110c and the Object Association Determination Server 120 may be, for example, implemented via a Local Area Network (LAN) or via the Internet.

Figure 1B:
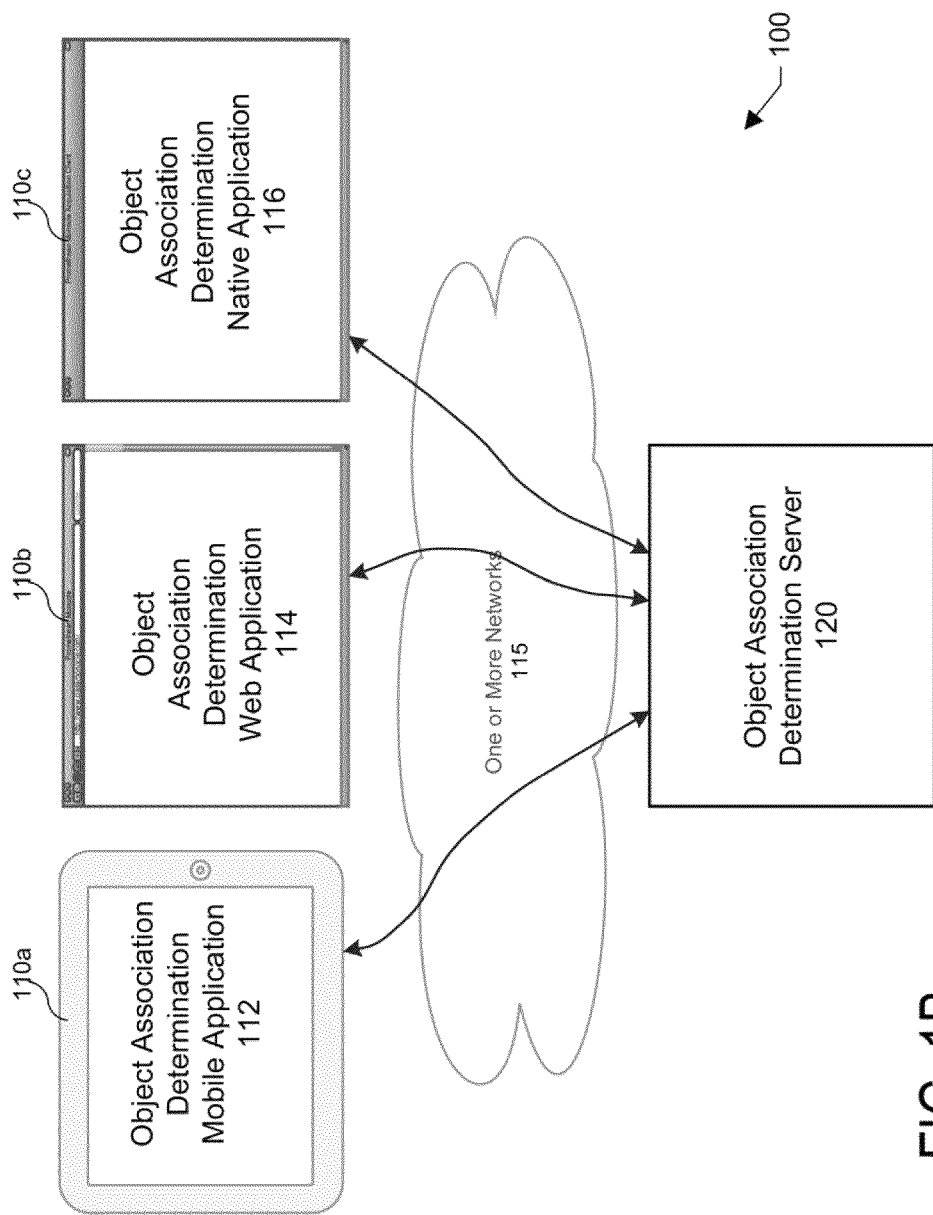
FIG. 1B is a block diagram of the object association tracking system in accordance with another embodiment of the present system.

As may be understood from FIG. 1B, in various embodiments, the One or More Remote Computing Devices 110a, 110b, 110c may be configured to run one or more Object Association Determination Applications 112, 114, 116 in order to provide access to the Object Association and Tracking System 100 to one or more users. In a particular embodiment, a mobile device such as, for example, a tablet computer or smartphone 110a, may be configured to run an Object Association Determination Mobile Application 112. In various embodiments, a desktop/laptop computer may be configured to run an Object Association Determination Web Application 114, for example, via a suitable web browser or the desktop/laptop computer may be configured to run an Object Association Determination Native Application 116. In other embodiments, a remote computing device such as an imaging device or other suitable computing device may be configured to run an Object Association Determination Native Application 116. Thus, it should be understood that the Object Association and Tracking System 100 may comprise one or more mobile computing devices having a built in camera coupled to the Object Association Determination Server 120b, one or more desktop or laptop computers coupled to the Object Association Determination Server 120, one or more smart imaging devices coupled to the Object Association Determination Server 120, and/or one or more imaging devices (e.g., cameras that do not perform image processing) coupled to the Object Association Determination Server 120.

Figure 2A:
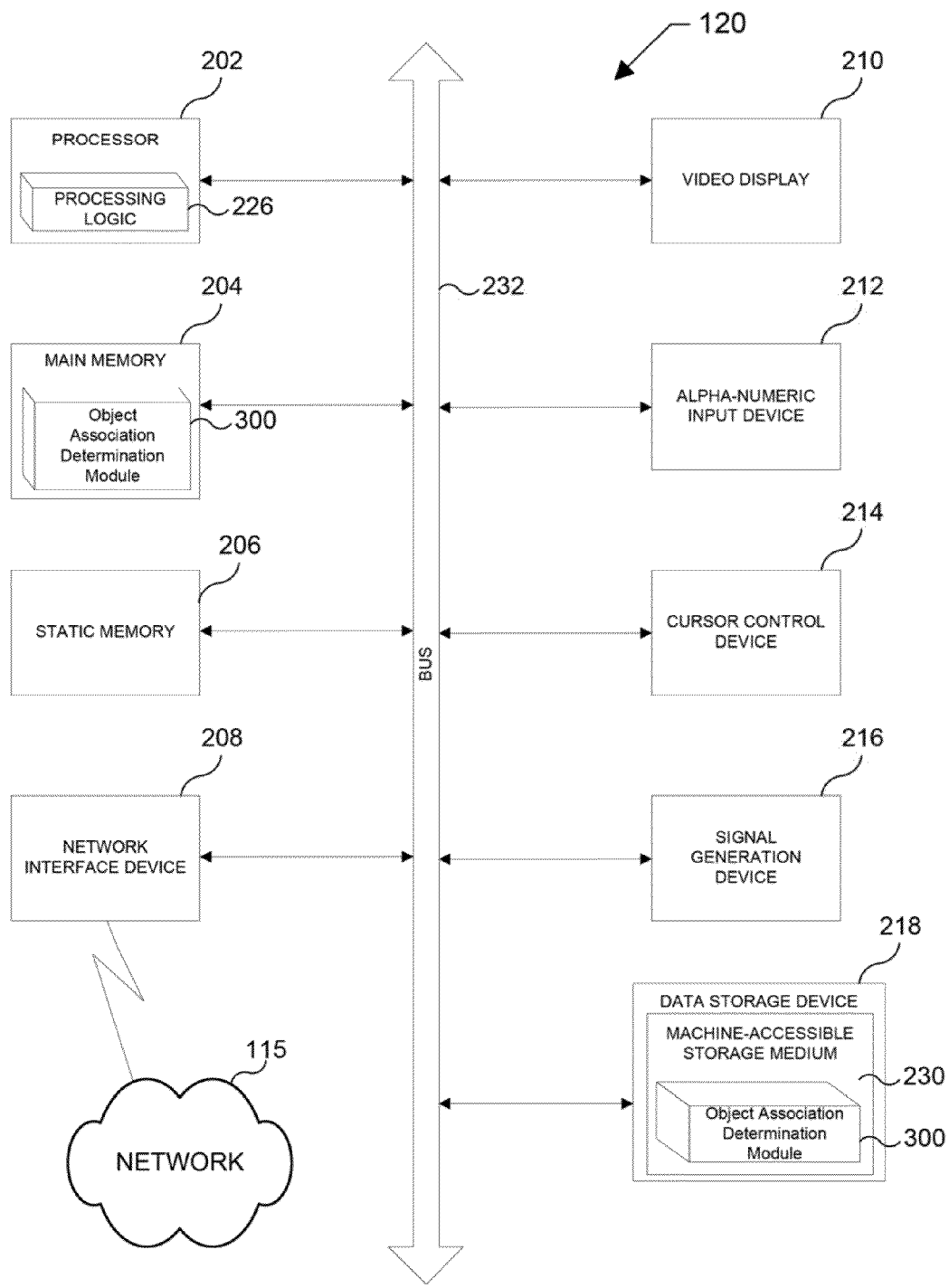
FIG. 2A is a schematic diagram of a computer, such as the object association determination server of FIG. 1, that is suitable for use in various embodiments.

FIG. 2A illustrates a diagrammatic representation of the architecture for the Object Association Determination Server 120 that may be used within the Object Association and Tracking System 100. It should be understood that the computer architecture shown in FIG. 2A may also represent the computer architecture for anyone of the One or More Remote Computing Devices 110a, 110b, 110c shown in FIG. 1. In particular embodiments, the Object Association Determination Server 120 may be suitable for use as a computer within the context of the Object Association and Tracking System 100 that is configured for capturing (e.g., and/or receiving an image captured by a suitable imaging device) an image at a particular time, performing object detection and identification analysis on the image, and storing information associated with the image and the particular time.

In particular embodiments, the Object Association Determination Server 120 may be connected (e.g., networked) to other computing devices in a LAN, an intranet, an extranet, and/or the Internet as shown in FIGS. 1A and 1B. As noted above, the Object Association Determination Server 120 may operate in the capacity of a server or a client computing device in a client-server network environment, or as a peer computing device in a peer-to-peer (or distributed) network environment. The Object Association Determination Server 120 may be a desktop personal computing device (PC), a tablet PC, a set-top box (STB), a Personal Digital Assistant (PDA), a cellular telephone, a web appliance, a network router, a switch or bridge, or any other computing device capable of executing a set of instructions (sequential or otherwise) that specify actions to be taken by that computing device. Further, while only a single computing device is illustrated, the term "computing device" shall also be interpreted to include any collection of computing devices that individually or jointly execute a set (or multiple sets) of instructions to perform any one or more of the methodologies discussed herein.

An exemplary Object Association Determination Server 120 includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose or specific processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The Object Association Determination Server 120 may further include a network interface device 208. The Object Association Determination Server 120 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computing device-accessible storage medium 230 (also known as a non-transitory computing device-readable storage medium or a non-transitory computing device-readable medium) on which is stored one or more sets of instructions (e.g., the Object Association Determination Module 300) embodying any one or more of the methodologies or functions described herein. The Object Association Determination Module 300 may also reside, completely or at least partially, within the main memory 204 and/or within the processing device 202 during execution thereof by the Object Association Determination Server 120—the main memory 204 and the processing device 202 also constituting computing device-accessible storage media. The Object Association Determination Server Module 300 may further be transmitted or received over a network 115 via a network interface device 208.

While the computing device-accessible storage medium 230 is shown in an exemplary embodiment to be a single medium, the term "computing device-accessible storage medium" should be understood to include a single medium or multiple media (e.g., a centralized or distributed database, and/or associated caches and servers) that store the one or more sets of instructions. The term "computing device-accessible storage medium" should also be understood to include any medium that is capable of storing, encoding or carrying a set of instructions for execution by the computing device and that cause the computing device to perform any one or more of the methodologies of the present invention. The term "computing device-accessible storage medium" should accordingly be understood to include, but not be limited to, solid-state memories, optical and magnetic media, etc.

Figure 2B:
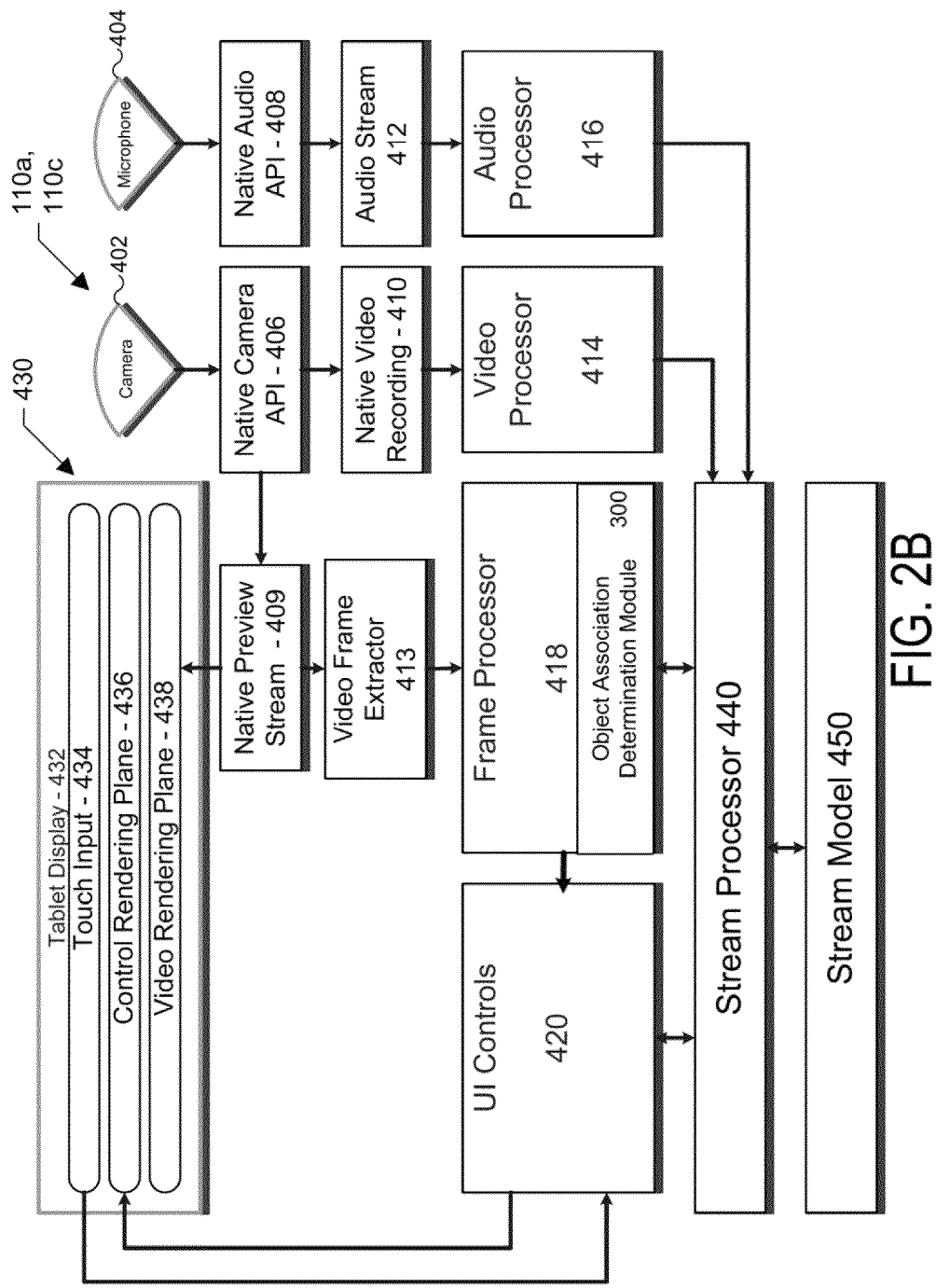
FIG. 2B is a schematic diagram of an image capture device, such as the tablet computer or the cameras of FIG. 1, that is suitable for use in various embodiments.

FIG. 2B illustrates a diagrammatic representation of the architecture for the one or more Remote Computing Devices 110a and 110c that may be used within the Object Association and Tracking System 100. In various embodiments, the one or more Remote Computing Devices 110a and 110c may be embodied as a Tablet Computer 110a comprising a Camera 402 and a Microphone 404. The Tablet Computer 110a, in this embodiment, is configured to utilize an application programming interface (API) to access the Camera 402 and Microphone 404. The Tablet Computer 110a may, for example utilize a Native Camera API 406 to access the Camera 402 and a Native Audio API 408 to access the Microphone 404. In this embodiment, the Tablet Computer 110a may be configured to use the Native Camera API 406 and the Native Audio API 408 to capture a Native Video Recording 410 and an Audio Stream 412 respectively from the Camera 402 and Microphone 404. The Tablet Computer 110a in this embodiment is further configured to provide the captured Native Video Recording 410 through a Video Processor 414 and the Audio Stream 412 through an Audio Processor 416. The video output from Video Processor 414 and Audio Processor 416 is sent to a Stream Processor 440, as described in greater detail below.

The Tablet Computer 110a includes a Tablet Display 432 on which the Tablet Computer 110a is configured to display, via a Video Rendering Plane 438, the Native Preview Stream 409 in addition to various UI Controls 420 that are displayed on a Control Rendering Plane 436. The Tablet Computer 430 further comprises a Touch Input 434, which the teacher may utilize to control various features of the Tablet Computer 110a.

The Tablet Computer 110a is further configured to extract a video frame using a Video Frame Extractor 413 from the Native Preview Stream 409. The Tablet Computer 110a sends the extracted video frame through a Frame Processor 418, which is generally configured to perform the functions describe below with respect to the Object Association Determination Module 300. The Frame Processor 418 may, for example, perform (1) change detection between the frame and a previous frame, (2) face detection, (3) face recognition, (4) content detection, and (5) content recognition. The Tablet Computer 110a is also configured to feed particular events and object associations to a Stream Processor 440 that is configured to create a Stream Model 450 that includes a timeline of the various events and object association information compiled by the system.

For purposes of this disclosure, (1) the term "media" should be broadly interpreted to include a video, picture, environmental state (e.g., light, darkness, temperature, etc.) captured within the stream, (2) the term "stream" should be broadly interpreted to mean a timeline on which event information and media is placed and processed to build further contextual metadata (i.e., information inferred from taking multiple objects on a stream and identifying patterns between the objects), and (3) the term "object" should be broadly interpreted to mean an identifiable entity (e.g., documents, expressions associated with people, projects, activities, any person, place or thing) that exists within the stream.

In various embodiments where the Camera 402, the Microphone 404 and the Tablet Display 432 are integrated, the Tablet Computer 110a is configured to carry out the steps of media capture, media ingestion, media processing, and media persistence. In particular, the Tablet Display 432, the Camera 402, the Microphone 404, the Native Camera API 406, the Native Audio API 408 and the Native Preview Stream 409 together function to capture media, which is handled through the hardware and operating system level tools available on the Tablet Computer 110a. The only exception to this is when media is uploaded to the Tablet Computer 110a (e.g., documents or photos are scanned in and send to the Tablet Computer 110a). In particular, the Tablet Display 432, the Camera 402, and the Microphone 404 are hardware that is resident in the Tablet Computer 110a. Furthermore, the Native Camera API 406, the Native Audio API 408 and the Native Preview Stream 409 are all APIs that are part of the Tablet Computer 110a operating system.

Additionally, media ingestion, the process of detecting changes of interest in the media, detecting objects of interest, and responsively augmenting live video feeds on the device is carried out by the Native Camera API 406, the Native Audio API 408, the Native Preview Stream 409, the Audio Stream 412, the Native Video Recoding 410, the Video Frame Extractor 413, the Audio Processor 416, the Video Processor 414, the Frame Processor 418, and the UI Controls 420. The Video Processor 414, the Audio Processor 416, the Frame Processor 418, and the UI Controls 420 are all controllers that are part of the Tablet Computer 110a and contain a series of software plugins that configure the controllers to perform detection of object types and association of metadata (e.g., location coordinates, compass direction, camera depth of field, etc.) with the piece of media placed on the stream.

Media processing, the deeper level processing where detected objects are processed to determine if the objects are recognizable, is generally carried out by the Audio Processor 416, the Video Processor 414, the Frame Processor 418, the UI Controls 420, and the Stream Processor 440. Finally, media persistence, the management of the local and online storage of media, low fidelity and high fidelity synchronization between the Tablet Computer 110a and the Object Association Determination Server 120, and the intelligent caching and lifecycle of local media on Computer Tablet 110a is carried out by the Stream Model 450.

It should be understood that although the architecture embodiment described immediately above is illustrated in the context of a Tablet Computer 110a, the architecture may describe similar systems such as a system having a remote smart imaging device, a remote computing device that does not have a display, or any other suitable system. In various embodiments, any of the above described processes and architecture may be performed and/or embodied in any suitable combination of devices. For example, a smart camera may capture images and audio using the Camera 402 and Microphone 404, perform all of the processing on internal processors (e.g., Video Processor 414, Audio Processor 416, Frame Processor 418) and then transmit a Native Preview Stream 409, Stream Model 450 or other output to a second remote computing device (e.g., server or distributed cameras) for viewing by a user or for further processing.

Exemplary System Platform

Various embodiments of a system for identifying objects of interest and determining association between/among various items of interest are described below and may be implemented in any suitable context. For example, particular embodiments may be implemented within the context of a school classroom to associate one or more students with particular objects (e.g., class papers, projects, etc.) on which the students may be working or with other people. Various aspects of the system's functionality may be executed by certain system modules, including an Object Association Determination Module 300, which may, for example, be executed as part of an Object Association Determination Mobile Application 112, Object Association Determination Web Application 114, and/or Object Association Determine Native Application 116, as discussed with regard to FIG. 1B above. The Object Association Determination Module 300 is discussed in greater detail below.

Object Association Determination Module

Figure 3:
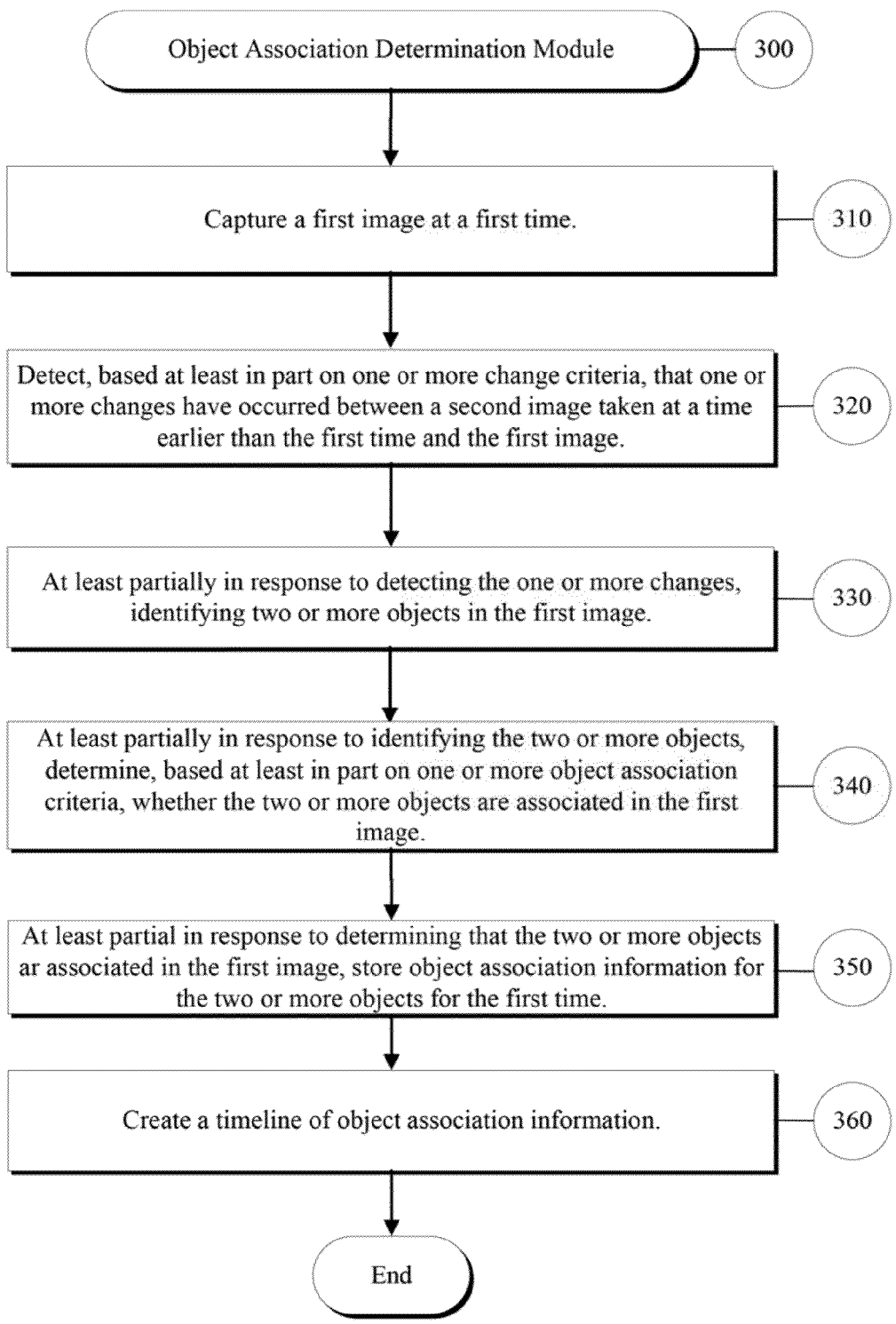
FIG. 3 depicts a flow chart that generally illustrates various steps executed by an Object Association Determination Module.

Referring to FIG. 3, when executing the Object Association Determination Module 300, the system begins, in various embodiments, at Step 310 by capturing a first image at a first time. In various embodiments, the system is configured to capture the first image using a suitable imaging device (e.g., such as a smart camera, a wearable device, a computing tablet, etc.), which may, for example, comprise one or more cameras and one or more processors. In particular embodiments, the first imaging device comprises one or more remote cameras (e.g., one or more wall or ceiling mounted cameras) which may, for example, be located in an area of interest and positioned to capture the area of interest by the camera. In various embodiments, the system is configured to capture the first image from a video stream taken by an imaging device. The system may, for example, be configured to capture the first image by taking a screen shot of a video feed or isolating an individual frame of the video feed. In other embodiments, the cameras may be configured to take individual pictures.

In some embodiments, the system is configured to capture the first image using a suitable mobile computing device equipped with one or more cameras such as, for example, a suitable smartphone (e.g., an iPhone, Android phone, etc.), suitable tablet computer (e.g., iPad, Microsoft Surface Tablet etc.), suitable wearable computing device (e.g., such as Google Glass, etc.), or any other suitable mobile computing device capable of capturing one or more images. In particular embodiments, the suitable imaging device also comprises a suitable infrared camera, night vision camera, ultraviolet camera or other suitable camera. In various embodiments, the imaging device may contain other capture devices (e.g., temperature sensors, noise detectors, vibration detectors or any other suitable detectors).

In various embodiments, the suitable imaging device is operatively coupled to one or more servers, for example, via a suitable wireless network (e.g., Wi-Fi, Bluetooth, Near Field Communication, et.) or via a suitable wired connection. In particular embodiments, the suitable imaging device is further configured to send and/or receive images (e.g., such as the first image) to and/or from the one or more servers.

Continuing at Step 320, the system is configured to detect, based at least in part on one or more change criteria, one or more changes that have occurred between a second image taken at a time earlier than the first time and the first image. In various embodiments, the system is configured to detect the one or more changes using the imaging device that captured the first image. In other embodiments, the imaging device that captured the first image is configured to transmit the first image, or at least a portion of the first image, to one or more servers or other suitable remote computing devices that are configured to receive the first image, or a portion of the first image, and perform the change detection.

In various embodiments, the second image is an image captured by the same imaging device that captured the first image. In particular embodiments, the second image is an image comprising substantially the same area of interest as the first image taken from substantially the same point of view. In other embodiments, the second image is an image captured by a different imaging device. In some embodiments, the first image and the second image comprise one or more of the same objects. In particular embodiments, the first and second images comprise the one or more of the same objects taken from substantially the same perspective. In other embodiments, the first and second images comprise the one or more of the same objects taken from substantially different perspectives (e.g., taken from one or more different cameras, taken from the same camera from a substantially different location (e.g., a wearable device), etc.).

In particular embodiments, the one or more change criteria comprise a criterion that one more objects within the first and second image have changed location between the second image and the first image. The system may, for example: (1) identify at least one object in the second image; (2) identify the at least one object in the first image; and (3) determine, based on a relative position of the at least one object to a second object in the second image versus a relative position of the at least on object to the second object in first image, whether the at least one object has moved between the second image and the first image. In embodiments in which the first and second images are captured by the same, substantially fixed camera, the system is configured to detect movement of at least one identified object within the first and second images based at least in part on a position of the at least one object within the first and second image.

In various embodiments, the one or more change criteria comprise a criterion that one or more new objects have appeared between the first image and the second image. The system may, for example, be configured to identify at least one object in the first image that the system could not identify in the second image taken at the earlier time. Similarly, in various embodiments, the one or more change criteria comprise a criterion that one or more objects identified in the earlier, second image have disappeared between the first and second images. The system may, for example, be configured to identify at least one object in the second image that the system is unable to identify in the first image or vice versa.

In some embodiments, the one or more change criteria comprise a criterion that an image histogram of the first image is sufficiently different from an image histogram of the second, earlier captured image. In particular embodiments, the system is configured detect the one or more changes based at least in part on the image histogram of the first image and the image histogram of the second image. In particular embodiments, the system is configured to create one or more histograms of one or more images. The system may, for example, be configured to create a histogram of the first image, create a histogram of the second image, and compare the histograms of the first and second images to detect that one or more changes have occurred between the second image and the first image. In particular embodiments, the system is configured to create a histogram that acts as a graphical representation of a tonal distribution of an image. In a particular embodiment, the histogram comprises a horizontal axis that represents tonal variations of the image (e.g., brightness) and a vertical axis that represents a number of pixels in that particular tone for the image. When comparing the image histogram of the first and second images, the system may be configured to detect that a change has occurred between the two images in response to determining that there is a sufficient difference between the two image histograms. In other embodiments, the system is configured to detect one or more changes by using a suitable histogram algorithm to detect sufficient change in light, brightness color or any other suitable image attribute between the second and first images. In some embodiments, sufficient change may constitute a change over a particular threshold. It should be understood that the above discussion focused on finding changes in a complete image, any of the change techniques described above may also be performed on any portion of the first image and a corresponding portion of the second image.

In particular embodiments, the system continues, at Step 330, by, at least partially in response to detecting the one or more changes, identifying two or more objects in the first image. In various embodiments, the system is configured to detect the one or more changes before continuing to Step 330 in order to at least partially reduce processing usage by the system and to at least partially conserve system resources. The step of identifying two or more objects may also be at least partially in response to scanning the image in search or recognizable objects regardless of whether one or more changes was detected.

In particular embodiments, the two or more objects may comprise, for example, one or more persons, one or more objects such as one or more papers, one or more bags, one or more weapons, one or more objects being held by the one or more persons, or any other suitable objects. In various embodiments, the system is configured to identify the two or more objects based at least in part on one or more object of interest preferences provided to the system. For example, in a security environment, the system may be configured to identify weapons, explosives, or other dangerous items as well as people and any other suitable objects which may be useful to identify for security purposes. In another particular example, the system may be configured, when utilized in a classroom setting, to identify (e.g., recognize) one or more students as well as one or more projects on which the one or more students may be working, one or more assignment papers that the one or more students may be completing, or any other suitable object related to education or the classroom setting. In various embodiments, where the system has recognized the existence of one or more objects but cannot identify the one or more objects, the system may be configured to flag the one or more objects and notify the user that the one or more objects were unidentifiable. In some embodiments, if the system believes it recognizes the one or more objects but is not certain of the identity, the system may be configured to flag the one or more objects and notify the user of the one or more objects and the potential identify of the one or more objects for user acceptance or rejection.

In particular embodiments, the system is configured to identify two or more objects as well as recognize the two or more objects as two or more objects that the system has previously identified (e.g., in an image the system has captured at a previous time). In particular embodiments, the system is configured to identify at least one of the two or more objects using suitable facial recognition techniques. The system may, for example, be configured to compare one or more facial features of a face identified in the first image with a facial database (e.g., which may be stored locally on the imaging device that captured the first image, partially stored locally on the imaging device that captured the first image, or remotely on one or more servers). In particular embodiments, the system may analyze a relative position, size, and/or shape of the eyes, nose, cheekbones, jaw, and other features of an identified face. In particular embodiments, the system is configured to use suitable 3-dimensional face recognition techniques, which may, for example, identify a face in the first image based at last in part on distinctive features on the surface of a face, such as the contour of the eye sockets, nose and chin. In still other embodiments, the system may identify a face as one or more of the two or more objects based at least in part on skin texture analysis. The system may, for example, analyze one or more unique lines, patterns, and spots apparent on a face's skin to identify the face as belonging to a particular person in the image.

In various embodiments, the system is configured to identify the one or more objects using suitable object identifying techniques. The system may, for example, identify one or more unique markings on a particular object in order to identify (e.g., and recognize) the particular object. For example, a piece of paper may have an identifying feature that includes suitable machine readable indicia (e.g., a barcode, QR code, or other suitable indicia). In another example, an object such as a backpack or suitcase may have a distinguishing mark such as a tag, scuff, sticker, or other distinguishing mark. In other embodiments, the system may be configured to identify a marking using suitable Optical Character Recognition (OCR) techniques. A piece of paper may, for example, include the words "Test Form B" at the top. The system may be configured to identify the piece of paper as a paper containing "Test Form B" by using OCR techniques to identify the words "Test Form B" on the paper. Alternatively, the system may be configured to identify one or more stray markings on the paper, which may, for example, have been made by one or more persons (e.g., a doodle in the margin of the paper, a person's name written on the paper, etc.). In other embodiments, the system may be configured to identify the one or more objects using suitable handwriting analysis techniques in order to, for example, identify a name written on a piece of paper. In still other embodiments, the system may allow the user to scan in a piece of paper and then allow the user to identify various regions of the paper using a touch screen or other input device coupled to the computing device. In this way, the system may learn the structure of a particular document that it can later use to recognize the document when detected in an image.

In various embodiments where the system is configured to recognize backpacks, suitcases or other objects, the objects may contain a low power identifier (e.g., low power Bluetooth transmitter, a RFID tag) that a sensor coupled to the system may read to identify the object. In other embodiments, the object may contain a QR code or other type of market that is printed in infrared or ultraviolet ink so that the marking is not visible to the naked eye but may be visible to the camera. In particular embodiments such as in a school setting, the system may identify people by detecting computing devices associated with the person, by detecting identification devices worn by the person (e.g., RFID bracelet, Bluetooth emitting device, etc.). The identification may then be confirmed using the facial recognition techniques described above.

Continuing at Step 340, the system, at least partially in response to identifying the two or more objects, determines, based at least in part on one or more object association criteria, whether the two or more objects are associated in the first image. In particular embodiments, the one or more object association criteria comprise a proximity criterion. In various embodiments, the proximity criterion includes a requirement that the two or more objects be within a particular distance of each other in the first image. The system may, for example, determine that two or more objects are associated with each other when one of the two or more objects is a person and the remaining two or more objects are within arm's reach of the person (e.g., between about 20 and about 30 inches apart). In other embodiments, the system is configured to determine whether the two or more objects are within a particular distance of one another in the first image (e.g., based on an area captured by the first image). For example, a substantially fixed image capturing device may capture images of a 20 foot by 20 foot room. In this example, the system may determine that two are more objects are associated if they are within a particular distance of each other in the room (e.g., within 2 feet, within 3 feet, etc.).

In particular embodiments, the system is configured to determine that the two or more objects are associated with one another based on one or more frequency criteria. The system may, for example, be configured to determine, for a plurality of images, a frequency with which the two or more objects are within the particular distance of one another. The system may, for example, determine based on a series of images captured over time that a person is associated with a backpack because the backpack is adjacent the person (or within a predefined distance from the person) for the entire period of time (e.g., in all of the images captured over the period of time). In another example, the system may determine that a person is not associated with a backpack despite the person being within arm's reach of the backpack in at least some of the series of images, because the person is not within arm's reach of the backpack sufficiently frequently over the period of time.

In particular embodiments, the system is configured to determine that the two or more objects are associated with each other based on one or more markings or identifying features of the two or more objects. For example, an object such as a backpack or any other suitable item may include a machine-readable indicia (e.g., a barcode, QR code, etc.) that the system is configured to read. The system may store information about the particular object that is associated with the machine-readable indicia. The information may include, for example, ownership information associated with the object, purchase information that identifies the person who originally purchased the object or any other suitable information that links the object to a person.

In various embodiments, the system is configured to determine that two or more objects are associated with each other based at least on handwriting analysis. In a situation in which one of the one or more objects is a person and a second one of the one or more objects is a piece of paper, the system my perform handwriting analysis on anything written on the piece of paper to determine who wrote on it (e.g., by comparing the handwriting to one or more known handwriting samples for one or more persons or using any other suitable handwriting analysis technique). The system may then determine whether the person (e.g., who may have been identified using one or more suitable facial recognition techniques is the same person responsible for the writing on the paper. In response to determining they are the same, the system may determine that the two objects (e.g., the person and the paper) are associated.

Continuing at Step 350, the system, at least partially in response to determining that the two or more objects are associated in the first image, stores object association information for the two or more objects for the first time. In various embodiments the system may be configured to store the association information in memory associated with the first imaging device (e.g., internal memory, in a local database, etc.). In various other embodiments, the system is configured to store the object association information on a suitable remote server such as, for example, a third party server, a networked server, a cloud server, etc. In particular embodiments, the object association information comprises information associated with the identified two or more objects, information associated with the determined association (e.g., which of the one or more association criteria were used to determine association), or any other suitable information. Other suitable information may include, but not be limited to, metadata associated with the layout of documents, scoring criteria (in the case where one of the objects is a test paper) and other key information about a particular object (e.g. location coordinates of the camera, compass direction, camera depth of field, etc.).

As a classroom example, the term "Art History Worksheet #2" may be defined in the system as a test paper. As the teacher walks around the class wearing a wearable computer having an image capture device, multiple images are captured of each student working on a paper. Each time the teacher circles the classroom, the system may detect multiple instances of objects labeled "Art History Worksheet #2" associated with each student. As a result, the system may associate particular instances of papers labeled "Art History Worksheet #2" with respective students. Thus, the system will recognize the existence of one or more students, recognize the existence of a paper associated with each student, identify the student and identify the papers. The system may then determine that a particular paper is associated with a particular student based on the proximity of the paper to the student, based on reading indicia on the paper that identifies the paper as belonging to the student or based on any other predetermined criterion. The system then stores the captured images, the association data and any other suitable data in memory.

Next, at Step 360, the system is configured to create a timeline of object association information. In various embodiments, the timeline comprises a visual depiction of an association between two or more objects over time. The system may, for example, utilize object association information derived from a plurality of images taken over a particular period of time. The timeline may depict the various times over the particular period of time at which the two or more objects were associated. The timeline may further include any other suitable information related to the object association information. Continuing with the previous example where multiple instances of an object are associated with a student, there may be multiple entries for each student's instance of the object across the course of a 50 minute period (or across multiple days of work) allowing the teacher to see the natural progress of the activity as the student completes more sections over time. Various embodiments of timelines are discussed more fully below.

In various embodiments, the system may also be configured to infer information by examining the association of multiple objects on a stream and by detecting patterns between the objects over time. For example, in the case where multiple children are grouped into work groups to work on a project, the system may determine which children belong to a certain group based on the amount of time that they are associated with other children in their assigned group.

Alternative Embodiments

In various embodiments, the system, when executing the Object Association Determination Module 300, may omit particular steps, perform particular steps in an order other than the order presented above, or perform additional steps not discussed directly above.

Server Confirmation of Object Identification

For example, in various embodiments, the system may comprise an imaging device that is operatively coupled to one or more servers. In such embodiments, the imaging device may capture the image, perform the steps of detecting one or more changes, identifying the existence of two or more objects in the first image and recognizing the two or more objects using lower complex detection and recognition algorithms, and determining whether the two or more objects are associated in the first image substantially locally (e.g., using computing and/or processing resources available on the imaging device). The system may further comprise one or more servers operatively coupled to the imaging device, and the system may be further configured to transmit at least a portion of the first image to the server. In particular embodiments, the imaging device is configured to transmit the entire first image to the one or more servers. In other embodiments, the system is configured to transmit only a portion of the first image to the one or more servers (e.g., a portion of the image comprising at least the two or more identified objects). In particular embodiments, the imaging device is configured to transmit the first image at full resolution. In still other embodiments, the imaging device is configured to transmit the first image at an at least partially compressed resolution to the one or more servers (e.g., to reduce an amount of bandwidth required to transmit the first image) and later transfer the first image at full resolution when there are less processing demands on the system.

In various embodiments, the one or more servers are configured to: (1) receive the at least a portion of the first image from the first imaging device; (2) at least partially in response to receiving the at least a portion of the first image, perform second object detection and recognition analysis to detect and identify two or more objects of interest in the first image using more complex detection and identification algorithms; (3) at least partially in response to identifying the two or more objects of interest in the first image, determining, based at least in part on the one or more object association criteria, whether the two or more objects of interest in the first image are associated in the first image; and (3) at least partially in response to determining that the two or more objects are associated in the first image, storing object association information for the two or more objects for the first time.

In particular embodiments, the second object detection analysis may comprise a more detailed analysis than the analysis performed by the imaging device. As will be understood by one skilled in the art, the one or more servers may have a higher processing capacity than the imaging device, and may, in various embodiments, be more suited to complete a more detailed object identification analysis of the first image. In particular embodiments the one or more servers may be utilized by the system to: (1) confirm the object identification analysis performed by the imaging device; (2) identify one or more objects of interest that the imaging device failed to identify; and/or (3) perform any other function related to the identification of objects of interest and determination of their association.

Dynamic Grading of Object of Interest and Augmenting Reality

In various embodiments, the system may be configured to dynamically grade and/or score an identified object of interest that comprises questions for which one or more students are providing answers. For example, the two or more objects may comprise a student and a document comprising a plurality of questions, where the plurality of questions has a plurality of related answer choices (e.g., multiple choice answer choices). The system may, for the identified document, be configured to determine an indicated answer choice for one or more of the plurality of questions (e.g., based on a selected answer of the answer choices indicated by bubbling or otherwise marking the selected answer by the student). In various embodiments, the system may capture an image in which the document is not directly visible in the first image (e.g., the document is at an angle). In such embodiments, the system may be configured to at least partially transform at least the portion of the image containing the document (e.g., by skewing, stretching, rotating, etc.) in order to facilitate determination of an indicated answer choice.

The system may then score the one or more of the plurality of questions in real-time based at least in part on an answer key associated with the document that is stored in memory. In various embodiments, the system is further configured to determine a substantially current grade for the document based at least in part on the scored one or more questions (e.g., by dividing the number of correct answers by the number of answered questions) and augment the real-time video feed by overlaying the score for each student on the video image in a way that allows the user to associate the score with the respective student. For example, in the case where a teacher is wearing a wearable computing device (e.g., Google Glass), as the teacher walks around the room, the wearable device is capturing video on what the teacher is looking at as they walk around the class. The system may identify and recognize the student and their associated paper, score the paper in real-time and display the substantially current grade on a display associated with the wearable (e.g., in the case of Google Glass the system may augment reality and place the score above the person in the substantially real-time image). The system may be configured to determine a substantially updated grade for the student each time the teacher circles the room by performing the steps above on further images captured by the system as the student works on the document.

Illustrative Examples

Classroom Application

In a particular example, the system may be implemented in a classroom setting to monitor and track association between students and projects or assignments on which they are working as well as association between two or more students. In a particular application in the classroom setting, the system may be configured to dynamically grade an assignment determined to be associated with a particular student and record that student's progress as they complete the assignment as well. In this example, the system is implemented in a high school science course in which students are completing a multiple choice worksheet in groups of two where the worksheet includes questions about reactions of various chemicals as a result of mixing. There are six students in the class (Students 1-6) and they are divided into Groups A (Student 1 and Student 2), B (Student 3 and Student 4), and C (Student 5 and Student 6). Group A is assigned to Station 1, Group B is assigned to Station 2, and Group C is assigned to Station 3.

In this example and referring once again to FIG. 4, the system comprises a Smart Camera 110c that includes a Camera 402 with an associated Microphone 404 that would be placed into the classroom. In this particular example, the Camera 402 is substantially fixed in the classroom and positioned in a suitable location for viewing the class members (e.g., Students 1-6) when they are at their stations, as well as the stations themselves. In this example, the Smart Camera 110c is configured to utilize an application programming interface (API) to access the Camera 402 and Microphone 404. In this example, the Camera 402 and Microphone 404 are embodied as a standalone imaging device (e.g., Smart Camera 110c), which may, for example, include one or more processors and memory and be configured to use the Native Camera API 406 and the Native Audio API 408 to record a Native Video Recording 410 and an Audio Stream 412 from the Camera 402 and Microphone 404, respectively.

The Smart Camera 110c in this example is further configured to run the Native Video Recording 410 through a Video Processor 414, which is configured to record the Native Video Recording 410 and perform positional object recognition as well as image extraction (e.g., screen capturing) and transcoding on the Native Video Recording 410. Similarly, the Smart Camera 110c is configured to run the Audio Stream 412 through an Audio Processor 416 configured to record audio, perform voice detection, and perform speech recognition on any detected voices. Voice detection and speech recognition may enable the system to determine which of the students completing the activity are more vocal (e.g., may be taking a more active role in completing the assignment) and provide that information to the teacher.

The Smart Camera 110c is further configured to send a Native Preview Stream 409 to a Tablet Computer 110a, which the teacher of the science class is using as she monitors the students completing the activity. The Tablet Computer 430 includes a Tablet Display 432 on which the Tablet Computer 430 is configured to display the Native Preview Stream 409 for the teacher via a Video Rendering Plane 438. The Tablet Computer 430 further comprises a Touch Input 434, which the teacher may utilize to control various features of the Tablet Computer 430 and a Control Rendering Plane 438.

The Smart Camera 110c is further configured to take a Video Frame 413 of the video feed from the Camera 402. In this example, the system is taking a video of the classroom as the students perform the activity, and may take a Video Frame 413 at particular time intervals (e.g., every minute, every two minutes, every second or any other suitable time interval) as the students work. The Smart Camera 110c then runs the Video Frame 413 through a Frame Processor 418, which is generally configured to perform the functions describe above with respect to the Object Association Determination Module 300. The Frame Processor 418 may be further configured to perform content detection where the system may detect the worksheets that the students are filling out, the stations at which they are working or any other suitable content. The Smart Camera 110c may then perform content recognition, where it may recognize the particular worksheet by reading a barcode on the top of the worksheet and recognize the particular work stations by using suitable OCR techniques to read a number off of the work station. The Smart Camera 110c may then perform auto region scoring on the worksheet to determine a substantially current score for the worksheet for each of the three groups.

In this example, the system may, over a series of analyzed video frames determine that half way through the lesson, Student 3 wandered away from Station 2 and spent five minutes at Station 1 (e.g., Student 3 was associated with Station 1 for five minutes) and then three minutes at Station 3 (e.g., Student 3 was associated with Station 3 for three minutes). During this time, the majority of the questions on Group B's worksheet was completed and scored correctly, while Group A and Group C made little progress on their worksheets. These particular events are then fed by the Smart Camera 110c to a Stream Processor 440 that is configured to create a Stream Model 450 that includes a timeline of the various object association information compiled by the system. The system may also store contextual metadata that the system infers based on patters detected in the timeline. For example, the system may detect that Student 3 generally walks around the classroom every day after a substantially fixed amount of time has passed during the class (e.g. after 10 minutes of work). The teacher can then access the Stream Model 450 via the Tablet Computer 430 using User Interface (UI) Controls 420 and view the timeline and associated stored data. When accessing the Stream Model 450 in this example, the teacher may determine that Student 3 is disruptive based on being a distraction to other groups and the ability of his assigned group to complete the assignment quickly. The teacher may then take any suitable action to improve the learning experience of Student 3 and the rest of the class by adjusting her teaching techniques for Student 3, splitting up the group of Student 3 and 4 and placing them with members of another group that need more help, by requiring Student 3 to repeat the assignment, or taking any other suitable action.

Security Application

In another illustrative application of the system, the system may be utilized in a security setting such as in an airport, train station, or other location where it may be valuable to be able to track people, objects, and the association between/among them. Security in an airport is of the utmost importance, and an abandoned suitcase or bag has the potential to become a major security issue. A series of cameras positioned throughout an airport, in this example, enable the system to determine an association between travelers and luggage, for example, by using facial recognition techniques to identify people and object identification techniques to identify their bags as they move through the airport. If, at any time, the system determines that an object such as a suitcase that the system has previously determined is associated with a particular traveler is no longer associated with that traveler (e.g., has been abandoned, is now associated with another traveler, etc.), the system is configured to generate an alert for a security officer to investigate.

User Experience

Figure 4:
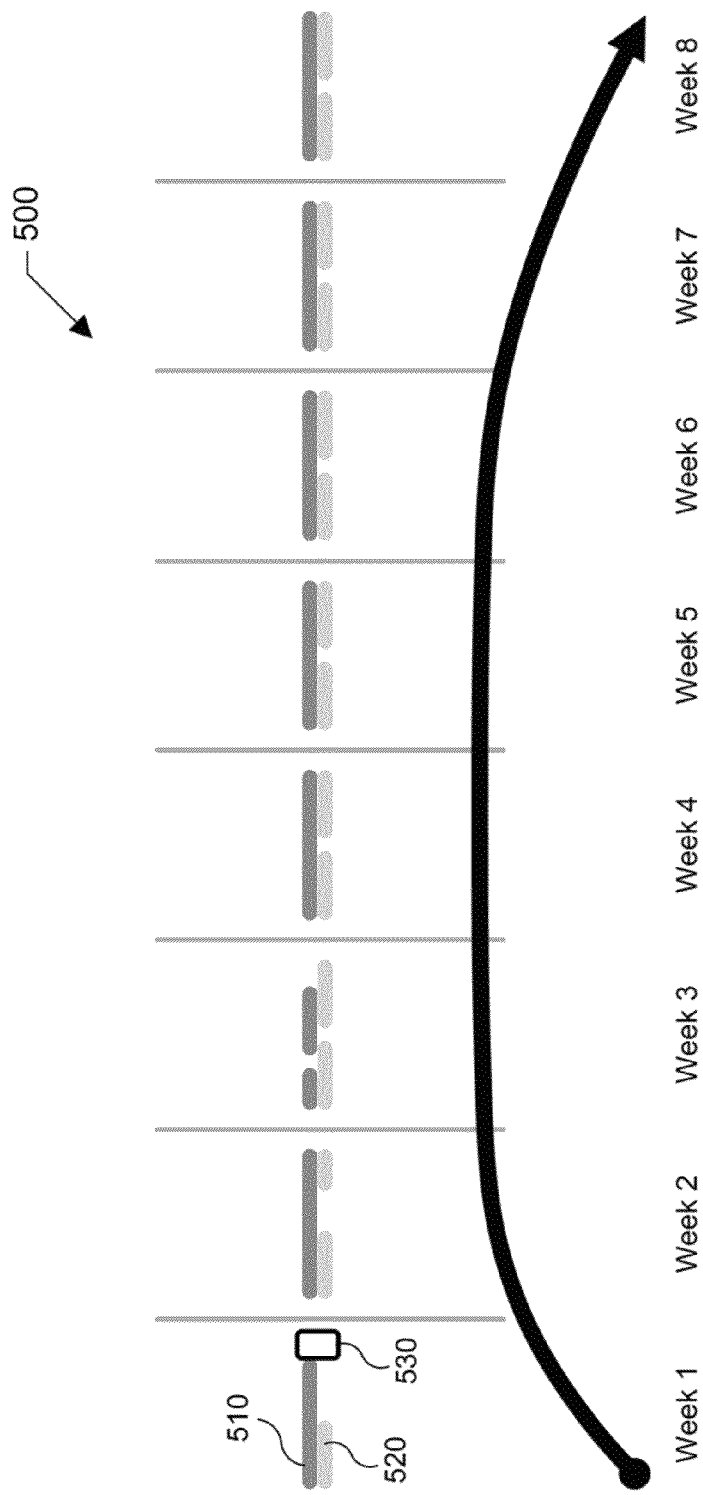
FIGS. 4-6 depict exemplary screen displays for enabling a user to view particular object associations.
Figure 5:
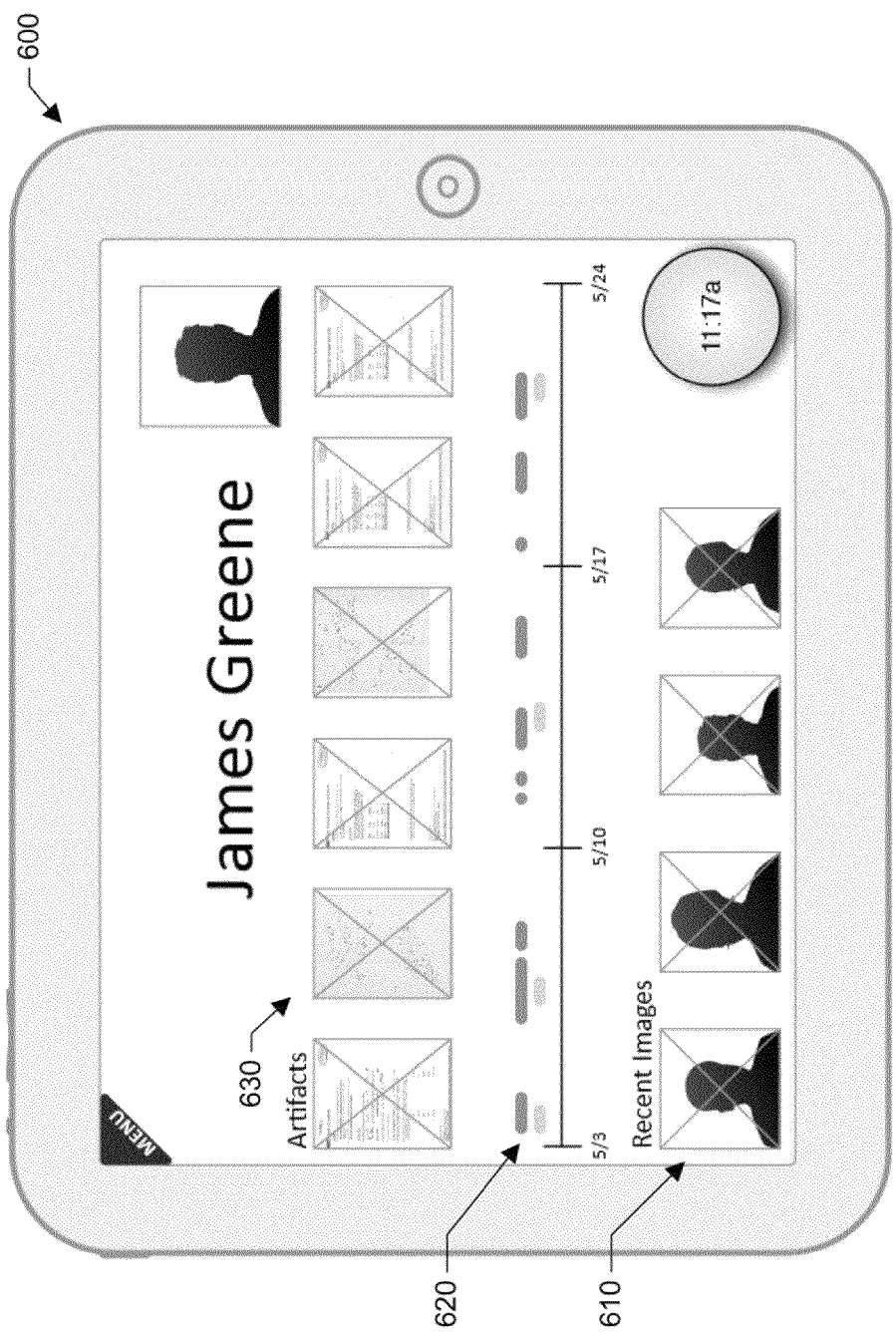
Figure 6:
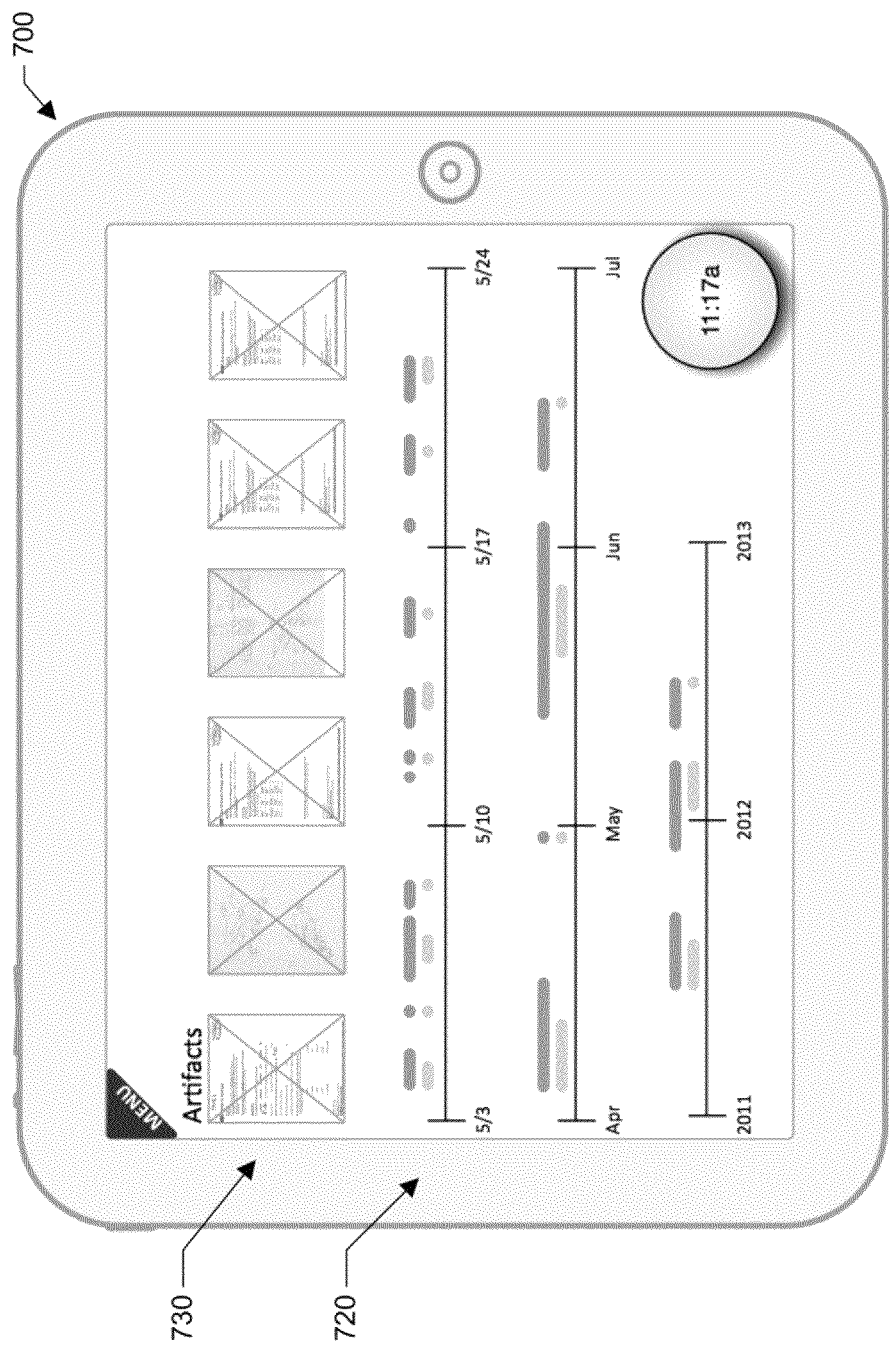

FIGS. 4-6 depict exemplary screen displays which a user may experience when using the system to access a timeline of association data for a particular object. FIG. 4 depicts a timeline 500 that illustrates a period of 8 weeks of object association data. As may be understood from this figure, the timeline includes lines representing first objects 510 and second objects 520 that show times during the 8 weeks at which the one or more of the first objects are associated with one or more of the second objects. As may be further understood from this figure, the periods in which the lines representing both the first objects 510 and the second objects 520 are both present represent times at which the system has determined that the first and second objects are associated. The timeline 500 further comprises a portion 530 in which neither first nor second objects were identified in any images captured during that period. In various embodiments, users may use the timeline 500 to examine the association of first objects with second objects.

In various embodiments, the line 510 may represent people and the line 520 may represent objects associated with the various people over time. Thus, when a user clicks on a particular location of line 510, the system may zoom into the timeline 500 and show a list of all people that were identified during the selected time period. Thus, if a user clicks on a particular person associated with the time line 510 during that time period, the time line 520 will show a list of objects that are associated with the selected person over the time period. Furthermore, if a user clicks on a particular location of line 520, the system may be configured to show a list of objects that were identified during the selected time period on line 520. Thus, when the user selects one of the listed objects, the system may be configured to provide a list of all of the people on line 510 that were determined to be associated with the particular object selected. Thus, the user may select an object and find all people associated with the object or conversely select a person and see all people or objects associated with the selected person.

FIG. 5 depicts an exemplary screen display 600 of object association data for a particular individual (e.g., James Green) over a three week period. The screen display 600 further depicts objects 630 (e.g., artifacts) associated with the selected individual and enables the user to select one or more particular objects 630 for which to view association data between the individual and the object via the timeline. In addition to viewing association data, the user may also view one or more specific instances of an object associated with the selected individual over time to see the progression of the object over time (e.g., how a test or project develops over time, the development of a short story over time, etc.)

As may be understood from FIG. 5, a user may select other individuals for whom to view object association data by selecting their picture from the list of pictures 610. The user may then view a timeline 620 of object association data for the selected picture over the illustrated period of time. Said another way, when the user selects a person from the list 610 of people shown on the timeline 620, the system may be configured to present a group of objects (e.g. documents) 630 that are associated with the selected person over the illustrated time period. Thus, the user may select and review individual documents from the document list 630 that are associated with the selected person.

FIG. 6 depicts another exemplary screen display 700 depicting timelines 720 of object association over various time periods. A user may select a particular object icon from the list of object icons 730 to view association data for the selected objects. Thus, once an object icon is selected, the screen may be configured to display a list of people (not shown) associated with the particular selected object. For example, in the case of an instance of a selected test, the system may be configured to show all people associated with the selected instance of the test. Thus, if the user selects a test for a particular person, the user may determine if other people were associated with the selected instance of the test. This may be helpful in detecting when a person is cheating on an exam since the selected instance of the test should only be associated with a single person. If another person is associated with the selected instance of the test, the association with the other person may indicate that cheating occurred.

CONCLUSION

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A computer system for tracking an association between two or more objects over time, the system comprising an imaging device comprising one or more cameras and one or more processors, wherein the imaging device is configured to:
   a. capture a first image at a first time;
   b. at least partially in response to capturing the first image, perform an object detection and identification analysis to detect and identify two or more objects of interest in the first image;
   c. at least partially in response to identifying the two or more objects of interest in the first image, determine, based at least in part on one or more object association criteria, whether the two or more objects are associated in the first image;
   d. at least partially in response to determining that the two or more objects are associated in the first image, store object association data for the two or more objects at the first time;
   e. capture a second image at a second time;
   f. at least partially in response to capturing the second image, detect, based at least in part on one or more change criteria, one or more changes between the first image and the second image;
   g. at least partially in response to detecting the one or more changes between the first image and the second image, perform the object detection and identification analysis to detect and identify the two or more objects of interest in the second image;
   h. at least partially in response to identifying the two or more objects of interest in the second image, determine, based at least in part on the one or more object association criteria, whether the two or more objects are associated in the second image; and
   i. at least partially in response to determining that the two or more objects are associated in the second image, store object association data for the two or more objects at the second time.

2. The computer system of claim 1, further comprising a server operatively coupled to the first imaging device, wherein:
   a. the first imaging device is configured to transmit at least a portion of the first image to the server; and
   b. the server is configured to:
      i. receive the at least a portion of the first image from the first imaging device;
      ii. at least partially in response to receiving the at least a portion of the first image, perform a second object detection and identification analysis to identify two or more objects of interest in the first image;
      iii. at least partially in response to identifying the two or more objects of interest in the first image, determining, based at least in part on the one or more object association criteria, whether the two or more objects of interest in the first image are associated in the first image; and
      iv. at least partially in response to determining that the two or more objects are associated in the first image, storing object association information for the two or more objects for the first time.

3. The computer system of claim 2, wherein:
   a. the first imaging device is configured to transmit at least a portion of the second image to the server; and
   b. the server is further configured to:
      i. receive the at least a portion of the second image from the first imaging device;
      ii. at least partially in response to receiving the at least a portion of the second image, perform the second object detection and identification analysis to identify two or more objects of interest in the second image;
      iii. at least partially in response to identifying the two or more objects of interest in the second image, determining, based at least in part on the one or more object association criteria, whether the two or more objects of interest in the second image are associated in the second image; and
      iv. at least partially in response to determining that the two or more objects are associated in the second image, storing object association information for the two or more objects for the second time.

4. The computer system of claim 1, wherein:
   a. performing object detection and identification analysis comprises using one or more facial recognition techniques to identify one or more of the two or more objects; and
   b. the one or more of the two or more objects comprise one or more faces.

5. The computer system of claim 4, wherein performing object detection analysis comprises recognizing one or more of the two or more objects based at least in part on one or more substantially unique markings on the one or more of the two or more objects.

6. The computer system of claim 5, wherein the one or more substantially unique marking comprise one or more machine-readable indicia selected from a group consisting of:
   a. three dimensional barcode;
   b. a two dimensional barcode;
   c. matrix barcode;
   d. optical character recognition; and
   e. hand writing recognition.

7. The computer system of claim 1, wherein the computer system is further configured to, at least partially in response to determining that the two or more objects are not associated in the second image, store object disassociation data for the two or more objects at the second time.

8. The computer system of claim 1, wherein the computer system is further configured to individually track each of the two or more objects over time.

9. The computer system of claim 2, wherein the computer system is further configured to synchronize the imaging device object association data with the server object association data.

10. The computer system of claim 2, wherein the object detection and identification analysis comprises a low resolution object detection and identification algorithm and the second object detection and identification analysis comprises a high resolution object detection and identification algorithm.

11. A computer-implemented method of tracking object association over a period time comprising:
   a. capturing, by a first imaging device, a plurality of images each taken at a particular time of the period of time;
   b. performing, by the first imaging device, object detection and identification analysis to identify two or more objects of interest in a first particular one of the plurality of images;
   c. detecting, by the first imaging device, based at least in part on one or more change criteria, one or more changes between the first particular one of the plurality of images and a second particular one of the plurality of images;
   d. at least partially in response to detecting the one or more changes between the first particular one of the plurality of images and the second particular one of the plurality of images, performing, by the first imaging device, object detection and identification analysis to identify the two or more objects of interest in the second particular one of the plurality of images;
   e. at least partially in response to identifying the two or more objects of interest in the second particular one of the plurality of images, determining, by the first imaging device, based at least in part on one or more object association criteria, whether the two or more objects are associated in the second particular one of the plurality of images;
   f. at least partially in response to determining that the two or more objects are associated in the second particular one of the plurality of images, storing, by the first imaging device, object association data for the two or more objects for the particular time at which the first imaging device captured the second particular one of the plurality of images.

12. The computer-implemented method of claim 11, wherein capturing the plurality of images comprises capturing the plurality of images from a video feed taken by the first imaging device.

13. The computer-implemented method of claim 11, wherein the two or more objects comprise:
   a. a first student; and
   b. a document comprising a plurality of questions, the plurality of questions having a plurality of related answer choices.

14. The computer-implemented method of claim 13, the method further comprising:
   a. determining, by the first imaging device, an indicated answer choice for one or more of the plurality of questions; and
   b. scoring, by the first imaging device, the one or more of the plurality of questions based at least in part on an answer key associated with the document and the indicated answer choice for the one or more of the plurality of questions.

15. The computer-implemented method of claim 14, the method further comprising:
   a. determining, by the first imaging device, a substantially current grade for the document based at least in part on the scored one or more questions; and
   b. displaying the substantially current grade to one or more teachers of the first student.

16. The computer-implemented method of claim 15, the method further comprising:
   a. performing, by the first imaging device, object detection and identification analysis to identify two or more objects of interest in a third particular one of the plurality of images;
   b. detecting, by the first imaging device, based at least in part on one or more change criteria, one or more changes between the third particular one of the plurality of images and the first particular one of the plurality of images, the one or more changes comprising completion, by the first student, of one or more additional questions on the document;
   c. determining, by the first imaging device, an indicated answer choice for the one or more additional questions; and
   d. scoring, by the first imaging device, the one or more additional questions based at least in part on the answer key indicated answer choice for one or more additional questions.

17. The computer-implemented method of claim 16, the method further comprising:
   a. determining, by the first imaging device, a substantially updated grade for the document based at least in part on the scored one or more additional questions; and
   b. displaying the substantially updated grade the one or more teachers of the first student.

* * * * *